US010066980B2

(12) United States Patent
Heath et al.

(10) Patent No.: US 10,066,980 B2
(45) Date of Patent: Sep. 4, 2018

(54) STREAMLINED PROBE FOR GUIDED WAVE RADAR MEASUREMENT (71) Applicant: Honeywell International Inc., Morristown, NJ (US)

(72) Inventors: Stuart James Heath, Surrey (CA); Michael Kon Yew Hughes, Vancouver (CA)

(73) Assignee: Honeywell International Inc., Morris Plains, NJ (US)

(*) Notice: Subject to any disclaimer, the term of this patent is extended or adjusted under 35 U.S.C. 154(b) by 472 days.

(21) Appl. No.: 14/698,009

(22) Filed: Apr. 28, 2015

(65) Prior Publication Data
US 2016/0320223 A1 Nov. 3, 2016

(51) Int. Cl.
G01S 13/08 (2006.01)
G01F 23/284 (2006.01)
G01S 7/03 (2006.01)
G01S 13/10 (2006.01)
G01S 13/88 (2006.01)
H01P 1/06 (2006.01)
H01P 3/123 (2006.01)

(52) U.S. Cl.
CPC ............ G01F 23/284 (2013.01); G01S 7/03 (2013.01); G01S 13/10 (2013.01); G01S 13/88 (2013.01); H01P 1/065 (2013.01); H01P 3/123 (2013.01)

(58) Field of Classification Search
USPC ........................................................ 342/124
See application file for complete search history.

(56) References Cited

U.S. PATENT DOCUMENTS

| 6,092,935 | A  | * | 7/2000  | Althaus    | G02B 6/4214 385/92 |
| 7,255,002 | B2 |   | 8/2007  | Gravel et al. | |
| 7,823,463 | B1 | * | 11/2010 | Feller     | G01F 1/667 73/861.27 |
| 7,870,793 | B1 | * | 1/2011  | Feller     | G01F 1/667 73/861.27 |
| 2006/0181450 | A1 | * | 8/2006  | Klees   | G01F 23/284 342/124 |
| 2007/0085729 | A1 | * | 4/2007  | Edvardsson | G01F 23/284 342/124 |
| 2010/0279561 | A1 | * | 11/2010 | Van Hoeken | B63B 27/24 441/5 |
| 2014/0266864 | A1 | * | 9/2014  | Fredriksson | G01F 23/284 342/124 |

(Continued)

FOREIGN PATENT DOCUMENTS

WO        2004051198 A1     6/2004

Primary Examiner — Marcus E Windrich
(74) Attorney, Agent, or Firm — Anthony Miologos (57) ABSTRACT A guided wave radar fluid level measurement system can measure the level of product in a tank. A pulse of RF energy sent along a waveguide in the tank can be reflected where the waveguide enters the product. A time of flight measurement can indicate the product level. The product inside the tank can flow and that flow can push the waveguide and thereby torque and possibly bend the waveguide. A streamlined wave guide is torqued less when the streamlining is aligned with the direction of flow. A rotating connector can provide for the waveguide to rotate and a weathervane effect can align the streamlined waveguide with the flow.

19 Claims, 5 Drawing Sheets (56) References Cited

U.S. PATENT DOCUMENTS

| | | | |
|---|---|---|---|
| 2015/0070206 A1* | 3/2015 | Hagglund | H01Q 21/50 342/124 |
| 2015/0177044 A1* | 6/2015 | Edvardsson | G01F 23/284 342/124 |
| 2016/0103007 A1* | 4/2016 | Fredriksson | G01F 23/284 342/124 |

* cited by examiner

STREAMLINED PROBE FOR GUIDED WAVE RADAR MEASUREMENT

TECHNICAL FIELD

Embodiments are generally related to level sensors, coaxial probes, and guided wave radars.

BACKGROUND

Guided wave radar level measurement is used in many industries to measure the level of product in a tank. The GWR level transmitter sends a short (-ins) pulse of RF energy along a waveguide and measures the time of flight of the signal reflected from the surface of the product in the tank. These waveguides are constructed of steel and come in rope, rod, and coaxial types. Chemical compatibility and physical strength must be considered because the waveguide must come into physical contact with the product. For rod type waveguides, the physical interaction between the fluid and the rod can lead to failure of the probe. An example of mechanical loading of a probe is moment loading of rod probes caused by drag load from process fluid moving past the probe. This drag load creates a bending moment at the process connection and can cause breakage. System and methods for reducing the bending moment of rod probes are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is therefore an aspect of the embodiments that a guided wave radar (GWR) level measurement system has a GWR transmitter, process connection, rotating connector, and waveguide. The process connection attaches the waveguide to a tank full containing a fluid. Note that the fluid can be a liquid, a powder, or bulk material that can flow into the tank, out of the tank, or within the tank. For example, a dry good such as corn is a bulk material that can flow into, out of, or within a tank. The fluid can also flow around the waveguide which is in the form of a rod.

It is also an aspect of the embodiments that the GWR transmitter can create a radio frequency (RF) signal that is passed through the process connection and to the waveguide which is inside the tank.

It is a further aspect that the waveguide has a streamlined section. The streamlined section can be the entirety of the waveguide or a portion of the waveguide. The streamlined section has a first end, a second end, a length, and a streamlined cross section. The first end and the second end are on either side of the length. The streamlined cross section is normal to the length and runs substantially the entire length of the streamlined section. The streamlined section can be rotationally attached directly to the process connection by a rotating connection such that the streamlined section can weathervane in the fluid flow. Weathervaning occurs when an object aligns itself with a fluid flow. Here, the streamlined section rotates along an axis parallel to the length and thereby reduces drag.

It is yet a further aspect that the streamlined section can have multiple sections, of which some are streamlined. Cylindrical sections have a circular cross-section and a higher drag coefficient than streamlined sections. Streamlined sections have a lower drag coefficient than cylindrical sections and can have a streamlined body cross section, partial circle cross section, or elliptical cross section. The bending moment generated by any portion of the waveguide is proportional to that portion's drag coefficient and its distance from the process connection. As such, the waveguide can have a higher drag coefficient near the process connection but should have a low drag coefficient farther from the process connection. For example, a two section waveguide can have a section with a streamlined body cross section rotationally connected to a cylindrical waveguide that is connected to the process connection. A cylindrical waveguide section does not need to be rotationally connected because it is rotationally symmetrical.

It is still another aspect that certain embodiments can have a waveguide section with a continuously varying cross-section. For example, the end nearest the process connection can be cylindrical with the cross-section smoothly changing to elliptical and then to a streamlined body cross-section at the end furthest from the process connection.

The rotational connection can have a stub, bushing, spring, and outer body. For example, the process connection can have a stub onto which a bushing is fit. A streamlined section can have an outer body that fits around the bushing and stub and is mechanically kept from detaching from the process connection. The bushing can be electrically conducting and a spring or the force of gravity can ensure electrical conductivity from the process connection through the length of the waveguide.

BRIEF DESCRIPTION OF THE FIGURES

The accompanying figures, in which like reference numerals refer to identical or functionally-similar elements throughout the separate views and which are incorporated in and form a part of the specification, further illustrate the present embodiments and, together with the detailed description of the embodiments, serve to explain the principles of the present embodiments.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the embodiments are shown. The embodiments disclosed herein can be embodied in many different forms and should not be construed as limited to the embodiments set forth herein rather, these embodiments are provided so that this disclosure will be thorough and complete, and will fully convey the scope of the embodiments to those skilled in the art. Like numbers refer to like elements throughout. As used herein, the term "and/or" includes any and all combinations of one or more of the associated listed items.

A guided wave radar fluid level measurement system can measure the level of product in a tank. A pulse of RF energy sent along a waveguide in the tank can be reflected where the waveguide enters the product. A time of flight measurement can indicate the product level. The product inside the tank can flow and that flow can push the waveguide and thereby torque and possibly bend the waveguide. A streamlined wave guide is torqued less when the streamlining is aligned with the direction of flow. A rotating connector can provide for the waveguide to rotate and a weathervane effect can align the streamlined waveguide with the flow. The streamlining can reduce the torque induced by the drag of the flowing fluid on the waveguide so that the waveguide doesn't bend, the process connection doesn't bend or break, and the tank itself doesn't cave, dent, or bend.

Figure 1:
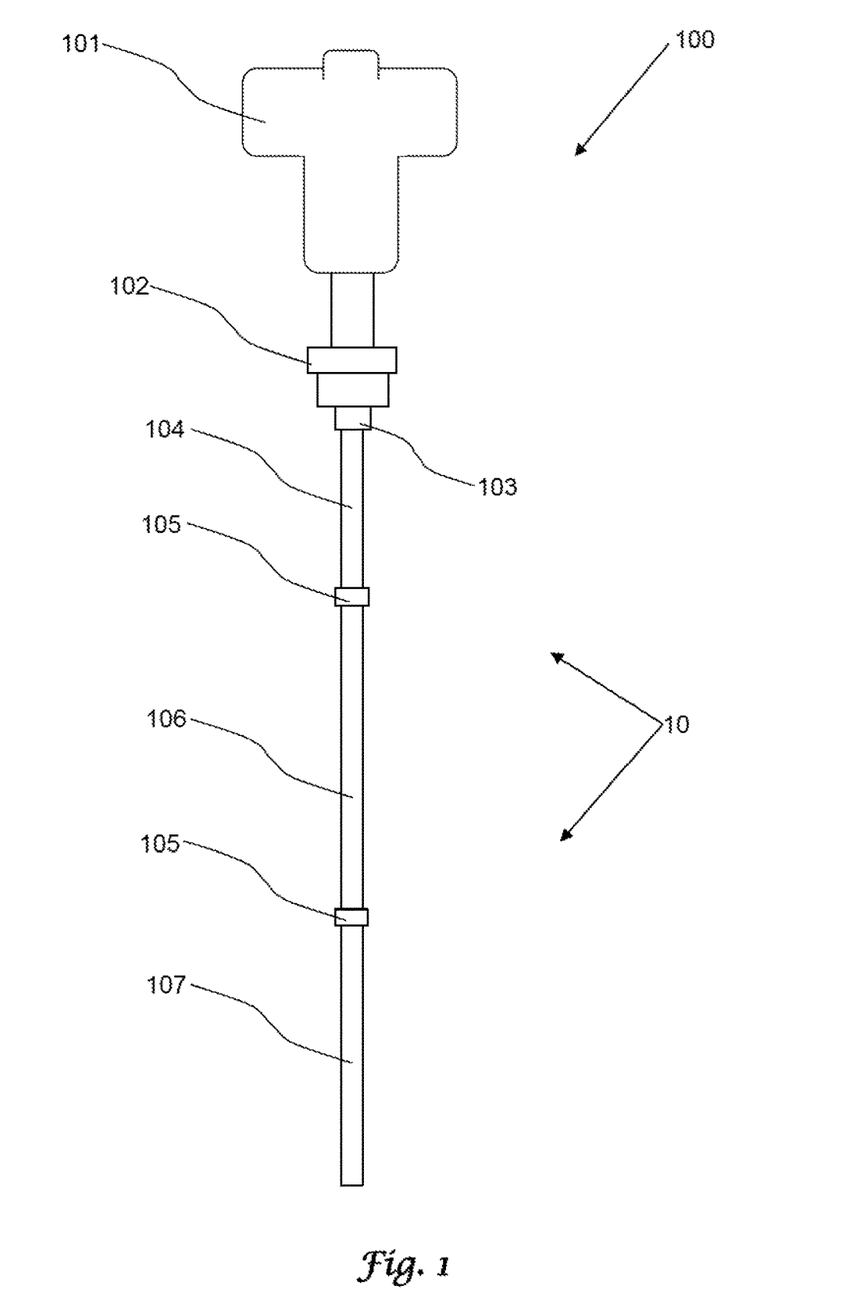
FIG. 1 illustrates a portion of a GWR level measurement system in accordance with aspects of the embodiments.

FIG. 1 illustrates a portion of a GWR level measurement system 100 in accordance with aspects of the embodiments. A radio frequency (RF) head 101 or guided wave radar (GWR) transmitter can generate an RF pulse and send the pulse through the process connection 102 and into the waveguide 108 by way of a first rotating connection 103. The waveguide 108 is illustrated as having three streamlined sections 104, 106, and 107 connected together by rotating connections 105. Each of the three streamlined sections 104 106, 107 can each rotate with respect to the other streamlined sections and with respect to the process connection 102. Multiple independently rotating streamlined section can be advantageous when the fluid at different levels can flow in different directions. The waveguide 108 must be stiff enough to resist bending into the tank wall or bending enough to introduce error into the level measurement. In some applications, 10% error is acceptable while other applications require the error to be less than 5%, 2%, 1%, or less. In some embodiments, the first rotating connection 103 and/or process connection are considered to be part of the waveguide. In some other embodiments, the first rotating connection 103 and/or process connection are not considered to be part of the waveguide.

Figure 2:
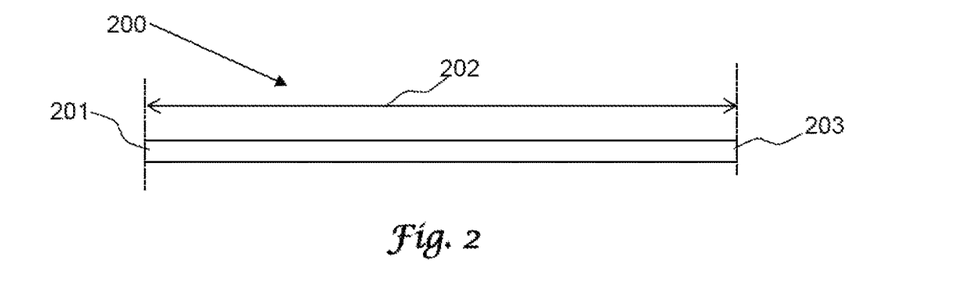
FIG. 2 illustrates a streamlined section having a length, first end, and second end in accordance with aspects of the embodiments.

FIG. 2 illustrates a streamlined section 200 having a length 202, first end 201, and second end 203 in accordance with aspects of the embodiments. Fluid flowing past the streamlined section has a direction of flow. The direction of flow generally has two components with a first component being normal to the length 202 and a second component being perpendicular to the length 202. In most installations, the waveguide is installed the length 202 being vertical such that the top surface of the fluid is normal to the length 202. In such installations, the first component is a horizontal component and the second component is a vertical component. A non-limiting installation with a vertical waveguide is assumed herein with the realization that the description and claims apply in a substantially similar manner to non-vertical installations.

Figure 3:
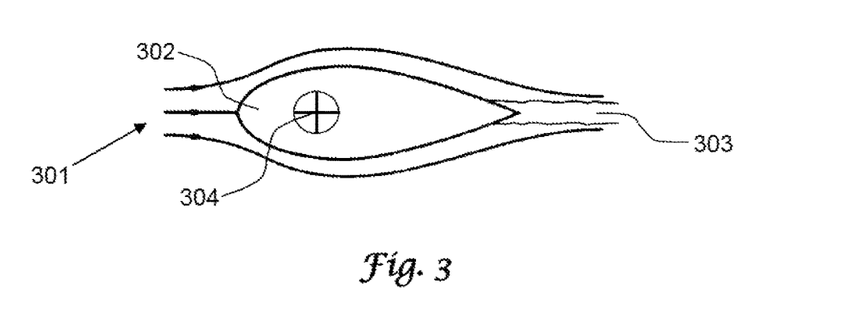
FIG. 3 illustrates a streamlined body cross-section in accordance with aspects of the embodiments.

FIG. 3 illustrates a streamlined body cross-section 302 in accordance with aspects of the embodiments. Those practiced in the art of airfoils and streamlined shapes will recognize that the streamlined body cross-section 301 describes a class of airfoils having substantially similar shapes having a generally tear-drop shape. Fluid flowing past the streamlined body cross-section 302 is indicated by a number of flow lines 301. The flow lines indicate fluid flowing smoothly past and along the airfoil (laminar flow) with a small zone of separated flow 303 coming off the trailing edge. A pivot point 304 is also indicated. The pivot point 304 is determined almost entirely by the rotational axis of the rotating connector. The pivot point 304 must be close enough to the airfoils leading edge that the streamlined section weathervanes in the flow such that a line from the leading edge to the trailing edge is substantially aligned with the direction the fluid would flow if not impeded by the streamlined section.

Figure 4:
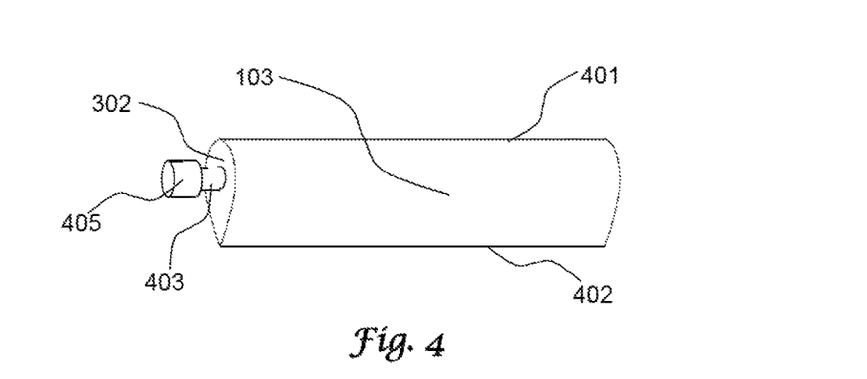
FIG. 4 illustrates a streamlined section having a stub and bushing in accordance with aspects of the embodiments.

FIG. 4 illustrates a streamlined section 103 having a stub 403 and bushing 405 in accordance with aspects of the embodiments. The streamlined body cross-section 302 is apparent with its leading edge 401 and trailing edge 402. An extrusion process can be used to form the streamlined section 103 as a solid piece or hollow piece. Regardless of the extrusion, a rotating connection must be accommodated at one or both ends of the streamlined section. In FIG. 4, the stub 403 and bushing 405 of a particular rotating connection are shown. The waveguide material should be substantially impervious to whatever fluid is being measured. Stainless steel is often a good choice. Particularly harsh conditions may require a more exotic alloy such as a superalloy or a material similar to Monel. Monel alloys are certain nickel alloys having at least 62% nickel and 27% copper. Examples of superalloys are Hastelloy, Inconel (e.g., IN100, IN600, IN713), Waspaloy, Rene alloys (e.g., Rene 41, Rene 80, Rene 95, Rene N5), Haynes alloys, Incoloy, MPOST, TMS alloys, and CMSX (e.g. CMSX-4) single crystal alloys.

Figure 5:
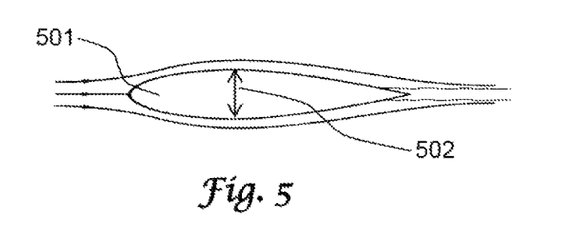
FIG. 5 illustrates another streamlined body cross-section in accordance with aspects of the embodiments.
Figure 6:
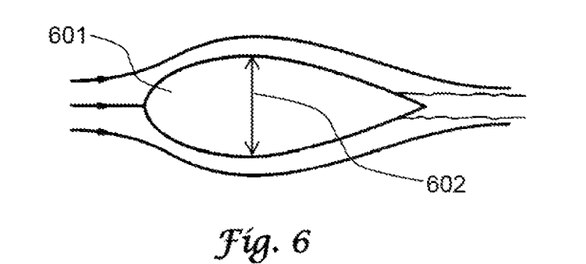
FIG. 6 illustrates yet another streamlined body cross-section in accordance with aspects of the embodiments.

FIGS. 5 and 6 illustrate other streamlined body cross-sections in accordance with aspects of the embodiments. The streamlined body cross-section 501 of FIG. 5 has a shorter thickness 502 than the thickness 602 of the streamlined body cross-section 601 of FIG. 6. Different thicknesses 502, 602 can change a number of properties such as drag, mechanical stability, stiffness, and manufacturability.

Figure 7:
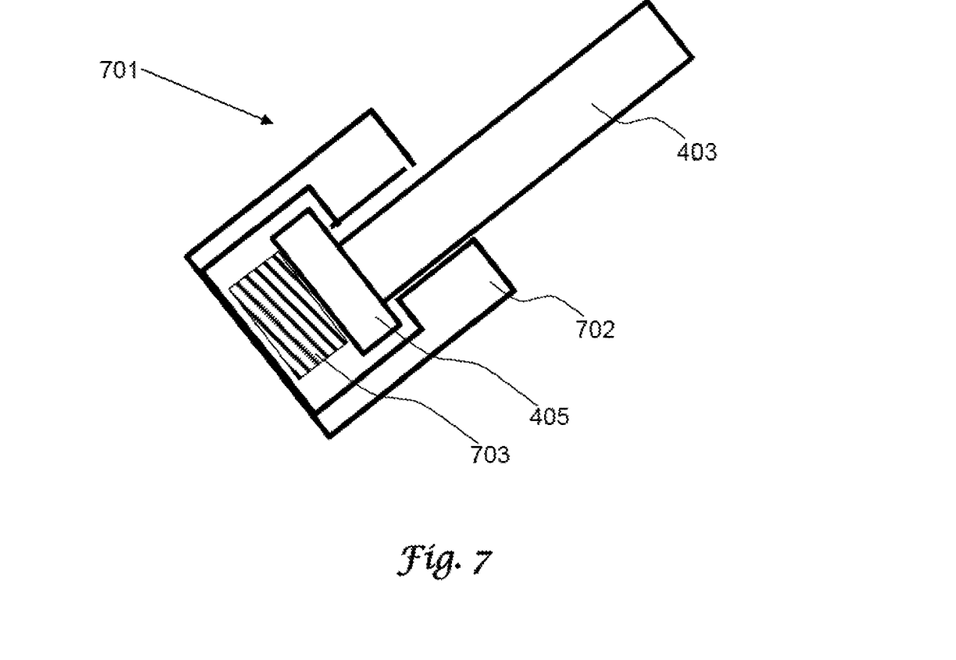
FIG. 7 illustrates a rotating connector in accordance with aspects of the embodiments.

FIG. 7 illustrates a rotating connector 701 in accordance with aspects of the embodiments. In this non-limiting example, a stub 403 is attached to bushing 405 such that the stub can't pull out of connector housing 702. A spring 703 presses bushing 405 onto connector housing 702 such that electrical connectivity is ensured or otherwise greater than if bushing 405 were not pressed into housing 702. Another non-limiting embodiment would have stub 403 passing through a second bushing or a bearing within housing 702 to provide for freer rotation and/or electrical connectivity. In yet another non-limiting example, the bushing 405 and stub 403 would be a single piece. The drawing does not indicate how either the housing or the stub attaches to a process connector or waveguide section although a plethora of attachment techniques are known and applicable. Those techniques include, but are not limited to, threaded connectors, welds, adhesives, pinning, press fitting, and clipping.

Figure 8:
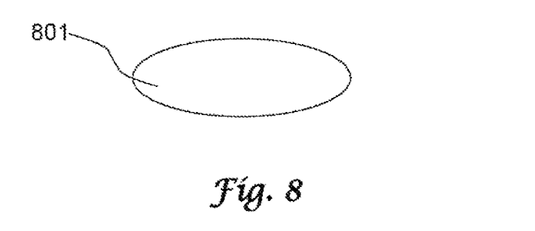
FIG. 8 illustrates an elliptical cross-section in accordance with aspects of the embodiments.

FIG. 8 illustrates an elliptical cross-section 801 in accordance with aspects of the embodiments. This cross-section is presented because it has lower drag than a fully circular cross-section and is mechanically stiffer in the direction of fluid flow.

Figure 9:
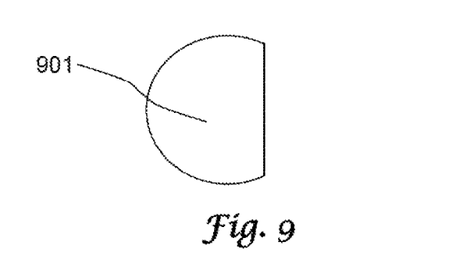
FIG. 9 illustrates a partial circle cross-section in accordance with aspects of the embodiments.

FIG. 9 illustrates a partial circle cross-section 901 in accordance with aspects of the embodiments. This cross-section is presented because it has lower drag than a full circle cross-section and because such a waveguide can be easily formed from a cylindrical waveguide by grinding a flat onto the cylinder.

Figure 10:
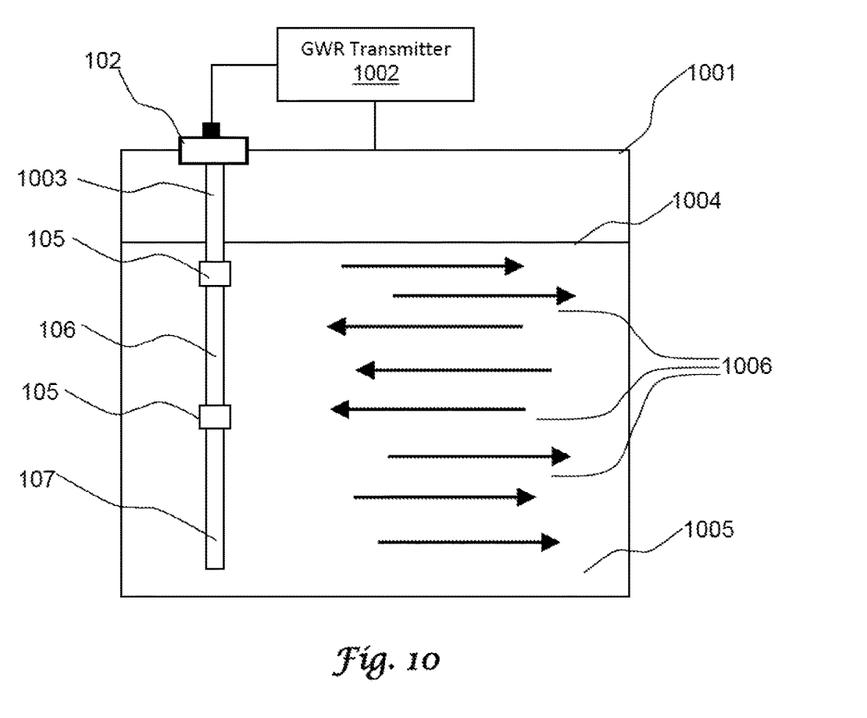
FIG. 10 illustrates a GWR level measurement system installed on a tank in accordance with aspects of the embodiments.

FIG. 10 illustrates a GWR level measurement system installed on a tank 1001 in accordance with aspects of the embodiments. A GWR transmitter 1002 can send an RF signal to the process connection 102 and thence into the waveguide. The waveguide is illustrated with a top cylindrical section 1003 that does not rotate and two streamlined sections 106, 107 that do rotate. The sections of the waveguide are connected by rotating connectors 105. A fluid 1005 fills the tank 1001 up to the fluid level 1004. The fluid can flow within the tank with the fluid at different levels possibly flowing in different directions as indicated by flow arrows 1006. The rotating waveguide sections 106, 107 can weathervane in the fluid flow to reduce torque and bending moment on the waveguide, process connection 102, and tank 1001.

Figure 11:
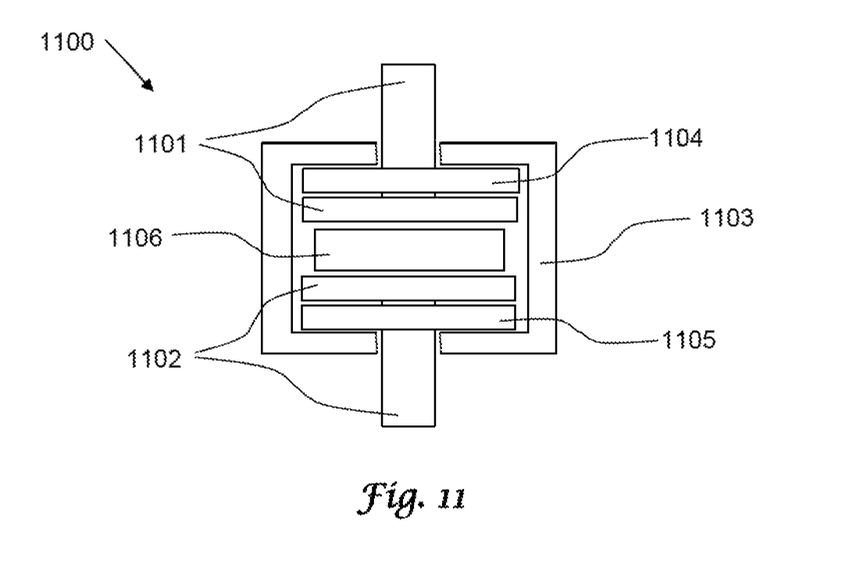
FIG. 11 illustrates another rotating connector for a GWR level measurement system in accordance with aspects of the embodiments.

FIG. 11 illustrates another rotating connector 1100 for a GWR level measurement system in accordance with aspects of the embodiments. This non-limiting example has two stubs 1101, 1102 within housing 1103. Two bushings or bearings 1104 and 1105 can help the stubs rotate freely. A spring 1106 can press the stubs apart although gravity can also provide such a force. The bushings/bearings 1104, 1105 and the spring 1106 can all help ensure that an RF pulse passing through the rotating connector experiences an impedance that is similar to that of the waveguide sections or that is easily distinguishable from that of the interface of the waveguide and fluid or fluid top surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A waveguide for a guided wave radar (GWR) level measurement system, the waveguide comprising:
a streamlined section wherein the streamlined section comprises a length, a cross-section, a first end, and a second end, wherein the first end and the second end are separated by the length, wherein the cross-section is streamlined such that the streamlined section is streamlined between the first end and the second end, and wherein the streamlined section is streamlined to reduce drag from a fluid flowing normally to the length; and
a rotating connector at the first end wherein the rotating connector connects the streamlined section to the GWR level measurement system, wherein the GWR level measurement system comprises a GWR transmitter and a process connection, wherein the process connection attaches the GWR level measurement system to a tank with the streamlined section inside the tank such that the fluid, when moving within the tank, causes the streamlined section to rotate and thereby reduce drag on the waveguide,
a second streamlined section rotatably connected to the first streamlined section by a second rotating connector wherein the second streamlined section has a streamlined body cross-section; and
a third streamlined section rotatably connected to the second streamlined section wherein the third streamlined section has a second streamlined body cross-section.

2. The waveguide of claim 1 wherein the cross-section is a streamlined body cross-section as illustrated in FIG. 3.

3. The waveguide of claim 1 wherein the cross-section is a partial circle cross-section as illustrated in FIG. 9.

4. The waveguide of claim 1 wherein the cross-section is an elliptical cross section.

5. The waveguide of claim 1 wherein the process connection comprises a stub and wherein the rotating connector connects to the stub to thereby provide a connection that rotates.

6. The waveguide of claim 1 further comprising a second streamlined section rotatably connected to the first streamlined section.

7. The waveguide of claim 1 wherein the rotating connector comprises an electrically conductive bushing.

8. The waveguide of claim 1 further comprising a spring that presses the rotating connector to thereby increase electrical conductivity through the length of the waveguide.

9. The waveguide of claim 1 wherein the streamlined section has a varying cross-section along its length.

10. The waveguide of claim 1 further comprising a cylindrical waveguide section between the streamlined section and the process connection.

11. The waveguide of claim 1 further comprising:
a cylindrical waveguide section between the streamlined section and the process connection wherein the cylindrical waveguide section comprises a stub and wherein the rotating connector connects to the stub to thereby provide a connection that rotates;
a fourth streamlined section rotatably connected to the third streamlined section wherein the fourth streamlined section has an elliptical cross-section;
a spring that acts on the rotating connector to thereby increase electrical conductivity through the rotating connector;
wherein the streamlined cross-section has a varying cross-section along its length;
and wherein the second rotating connector comprises an electrically conductive bushing.

12. A waveguide for a guided wave radar (GWR) level measurement system, the waveguide comprising:
a streamlined section wherein the streamlined section comprises a length, a cross-section, a first end, and a second end, wherein the first end and the second end are separated by the length, wherein the cross-section is streamlined such that the streamlined section is streamlined between the first end and the second end; and a
rotating connector at the first end wherein the rotating connector connects the streamlined section to a cylindrical waveguide section, wherein the GWR level measurement system comprises a GWR transmitter, a process connection, and the cylindrical waveguide section, wherein the cylindrical waveguide section is connected to the process connection, wherein the process connection attaches the GWR level measurement system to a tank with the cylindrical waveguide section and the streamlined section inside the tank such that a fluid moving within the tank causes the streamlined section to rotate and thereby reduce torque on the process connection, a second streamlined section rotatably connected to the first streamlined section by a second rotating connector wherein the second streamlined section has a streamlined body cross-section; and a third streamlined section rotatably connected to the second streamlined section wherein the third streamlined section has a second streamlined body cross-section.

13. The waveguide of claim 12 wherein the cross-section is a streamlined body cross-section.

14. The waveguide of claim 12 wherein the cross-section is a partial circle cross-section.

15. The waveguide of claim 12 wherein the cylindrical waveguide section comprises a stub and wherein the rotating connector connects to the stub to thereby provide a connection that rotates.

16. The waveguide of claim 12 wherein the rotating connector comprises an electrically conductive bushing.

17. A guided wave radar (GWR) level measurement system, the waveguide comprising:
a GWR transmitter;
a process connection wherein the process connection attaches the GWR level measurement system to a tank;
a waveguide connected to the process connection wherein the waveguide is inside the tank;
a streamlined section wherein the waveguide comprises the streamlined section, wherein the streamlined section comprises a length, a first end, and a second end, wherein the first end and the second end are separated by the length, wherein the streamlined section is streamlined to reduce drag from a fluid flowing normally to the length; and
a rotating connector that rotatably attaches the streamlined section at the first end into the GWR level measurement system such that the flowing fluid causes the streamlined section to weathervane and thereby reduce drag on the waveguide,
a second streamlined section rotatably connected to the first streamlined section by a second rotating connector wherein the second streamlined section has a streamlined body cross-section; and
a third streamlined section rotatably connected to the second streamlined section wherein the third streamlined section has a second streamlined body cross-section.

18. The GWR level measurement system of claim 17 further comprising a cylindrical waveguide section wherein the rotating connector rotatably attaches the streamlined section to the cylindrical waveguide section.

19. The GWR level measurement system of claim 18 wherein the cylindrical waveguide section comprises a stub wherein the rotating connector rotatably attaches the streamlined section to the cylindrical waveguide section.

\* \* \* \* \*